Oct. 25, 1932.  A. H. STRONG  1,884,353
REFRIGERATING SYSTEM
Filed Aug. 8, 1930  5 Sheets-Sheet 1
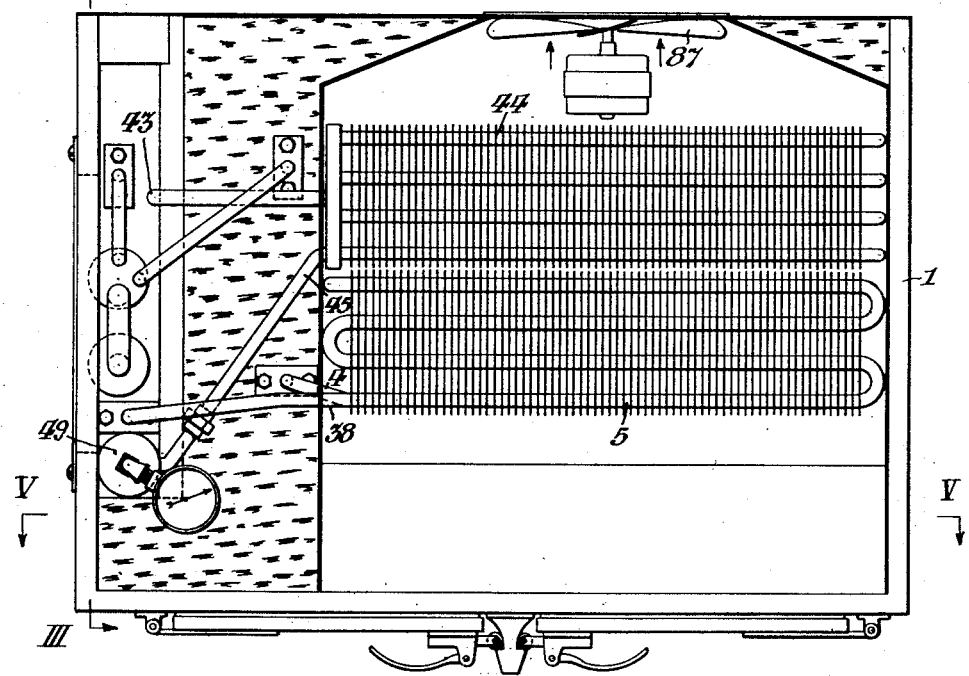
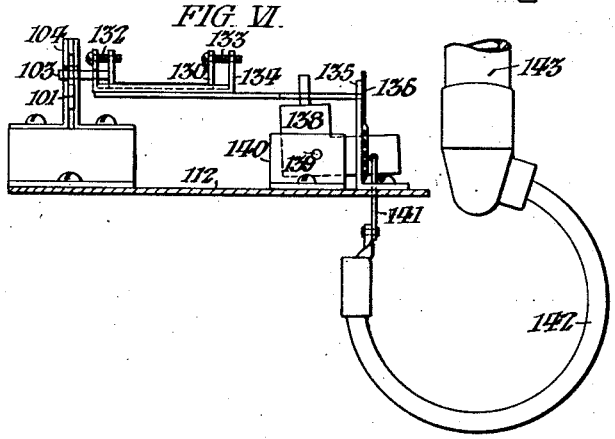
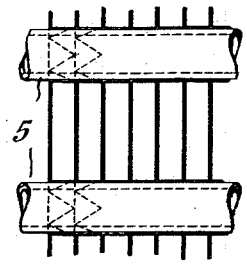
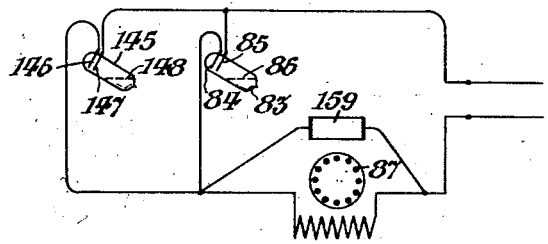
INVENTOR:
ARCHIE HUGH STRONG,

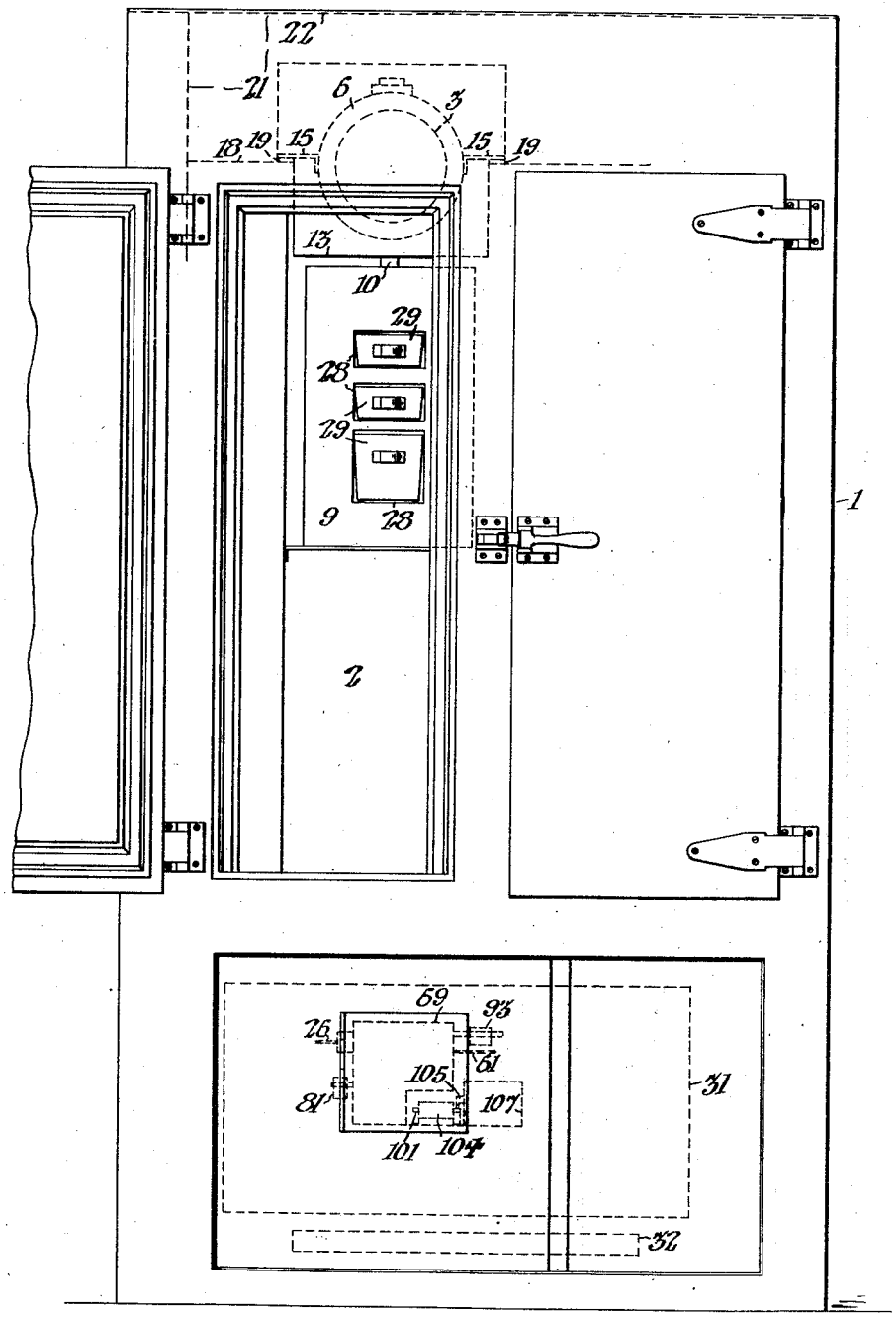

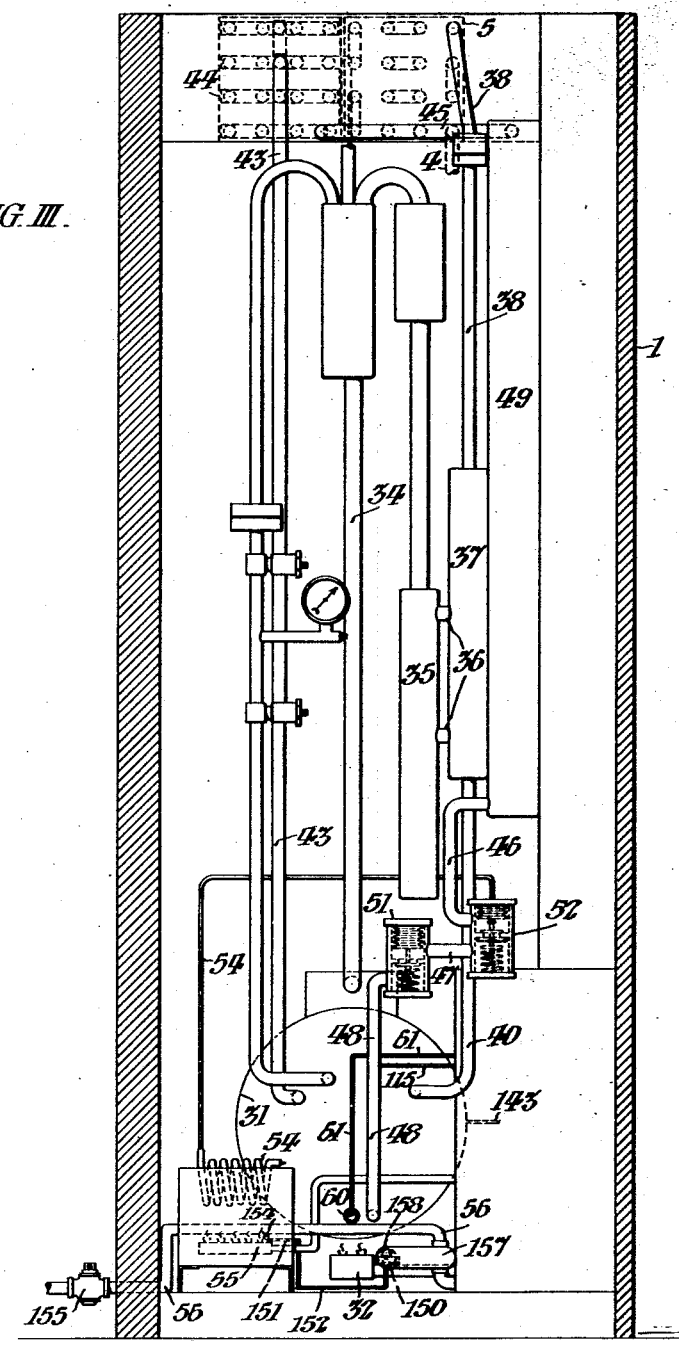

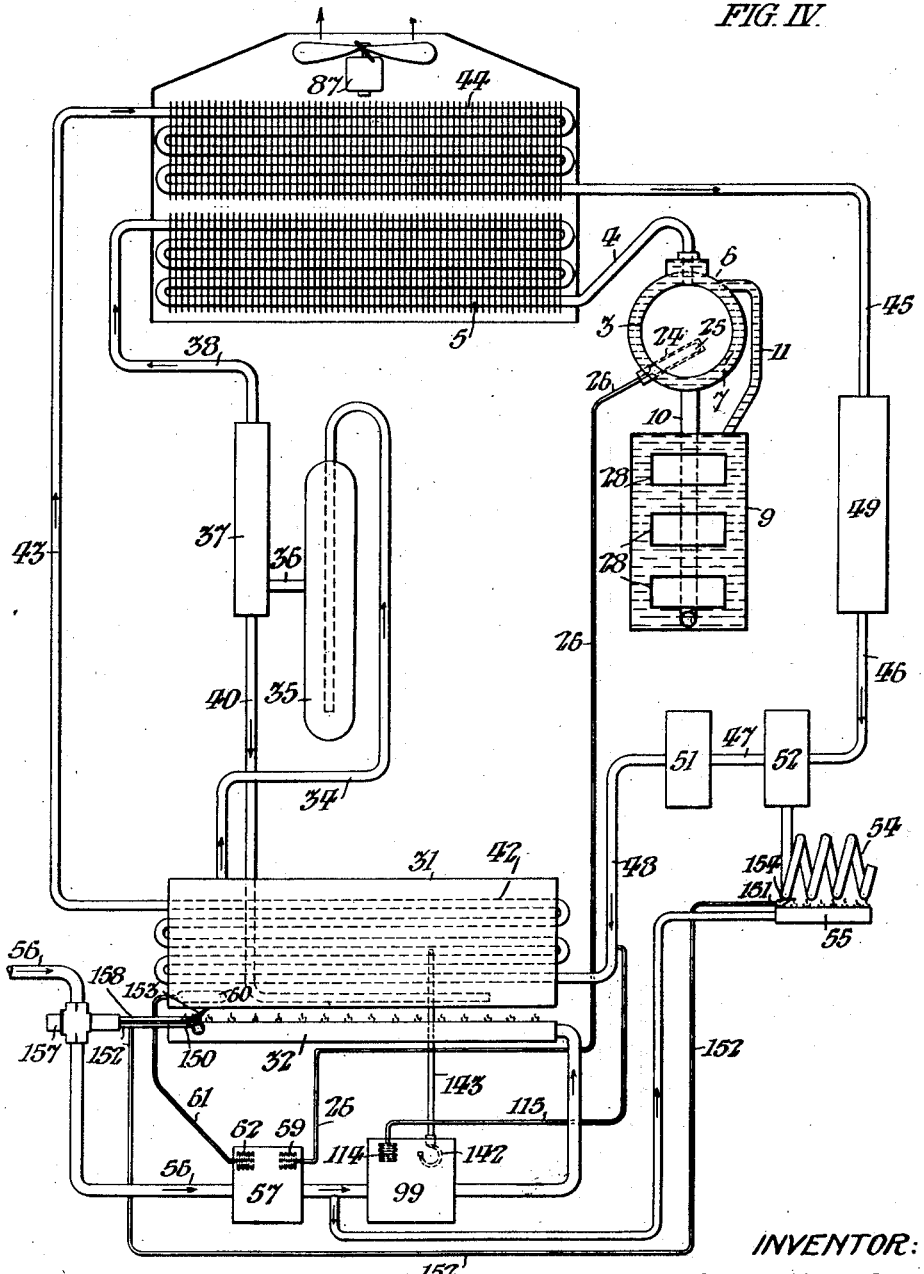
FIG. IV.

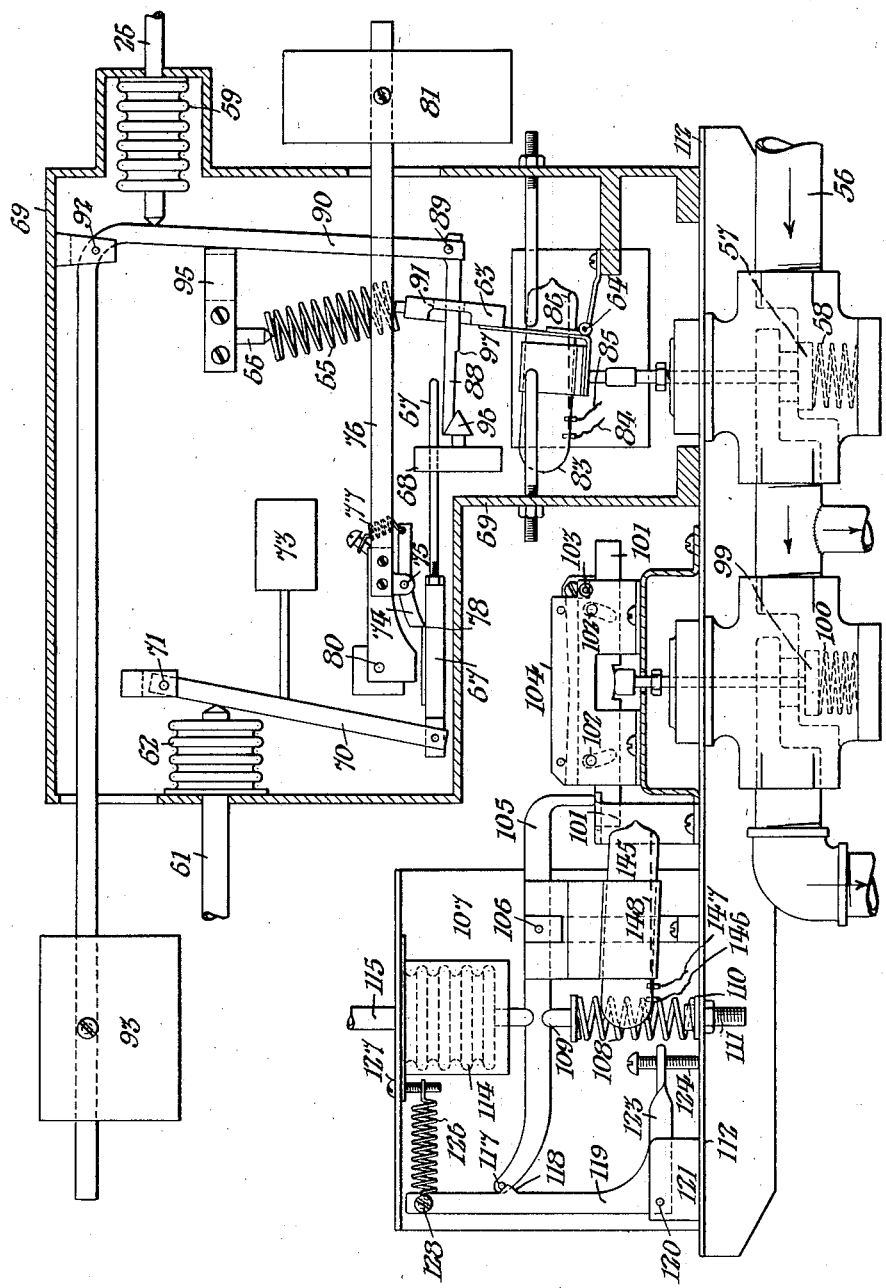

Patented Oct. 25, 1932

1,884,353

UNITED STATES PATENT OFFICE

ARCHIE HUGH STRONG, OF NORRISTOWN, PENNSYLVANIA, ASSIGNOR TO MASTER DOMESTIC REFRIGERATING COMPANY, INC., OF CONSHOHOCKEN, PENNSYLVANIA, A CORPORATION OF NEW YORK

REFRIGERATING SYSTEM

Application filed August 8, 1930. Serial No. 473,922.

My invention relates to refrigerating systems of the ammonia absorption type and particularly to the construction and arrangement of means for air cooling both the main refrigerant and an auxiliary refrigerant which is utilized to dissipate the heat from the ammonia generator in the intervals between operations of the latter to generate ammonia from an aqueous solution thereof in said generator.

As hereinafter described, two separate condensing coils are provided respectively for the ammonia and for the auxiliary refrigerant, of similar construction in that a conduit for the refrigerant has several successive portions thereof disposed in parallel relation and extending through a series of plates which extend transversely to the axes of the conduits and which serve to absorb heat from the conduits and dissipate it to the surrounding atmosphere. Said two coils are disposed in such relation in an air flue that air may be caused to transversely pass over and cool first the coil for the main refrigerant and second the coil for the auxiliary refrigerant, such passage of the air being forcibly effected by an electrically actuated fan and with the effect that both coils are rapidly and efficiently cooled by the same stream of air moved by the fan. As hereinafter described, the air is caused to move by exhausting it from one end of said air flue. However, it is to be understood that it may be moved by compressing it.

My invention includes the various novel features of construction and arrangement hereinafter more definitely specified. However, the method and means for evaporating the main refrigerant, such as ammonia, as hereinafter described, are claimed in my copending application Serial No. 473,923 filed August 8, 1930, for Letters Patent of the United States for improvement in refrigerating systems.

In said drawings; Fig. I is a plan view of a refrigerator structure conveniently embodying my invention. Fig. II is a front elevation of said structure with the closure of the control chamber at the bottom thereof removed, indicating the automatically operative control elements therein, and with the left hand door open to show the evaporator in the food chamber. Fig. III is a vertical sectional view of said structure taken on the line III, III, in Fig. I in the direction of the arrows on said line. Fig. IV is a diagram of the refrigerating system included in said structure. Fig. V is a partly sectional, elevational view of the automatically operative control mechanism shown in the lower part of Fig. II, taken in the direction of the arrows, on the line V, V, in Fig. I. Fig. VI is an elevation, partly in section, showing the automatically operative safety gas valve control mechanism indicated in Fig. V, as viewed from the right of Fig. V. Fig. VII is a fragmentary sectional view of part of one of the similar refrigerant condensing coils indicated in Figs. I and IV. Fig. VIII is a diagram of the electrical circuits including the fan motor.

In said figures; the casing 1 incloses the food storage chamber 2 which is to be refrigerated. The ammonia evaporator consists of the cylindrical container 3 which is supplied with liquid ammonia through the conduit 4 leading from the ammonia condenser 5. Said container 3 is surrounded by the cylindrical jacket 6 in concentric spaced relation therewith and containing brine 7. Said brine jacket is in communication with the brine tank 9 below it through the brine conduit 10 extending from the bottom of the jacket to the bottom of the tank 9, and the conduit 11 extending from the top of said jacket to the top of said tank. Said ammonia container 3 and the appurtenances thereof forming the evaporator is inclosed in the metal box 13 containing granular cork or other suitable heat insulating material surrounding its contents. Said box has ledges 15 projecting from the opposite sides thereof which rest upon the top wall 18 in said casing 1 with the rubber gasket 19 interposed between said ledges and said wall. As indicated, the upper portion of said evaporator structure is inclosed in the chamber 21 in said casing 1, conveniently provided with the removable lid 22.

Said container 3 has a tubular sheath 24 extending in it to receive the thermostatic bulb 25 which may contain any fluid having a high coefficient of heat expansion and which may be connected by the tube 26 with the thermostatic control system by which the supply of liquid ammonia to said container 3 is controlled in any suitable manner.

As indicated, said brine tank 9 includes a vertical series of ice pan recesses 28 which are open at the front of the tank, as shown in Fig. II, and adapted to respectively contain removable ice pans 29 which are charged with water to form ice by the operation of the refrigerating system.

As indicated in Fig. IV, said system includes the generator 31 containing the main refrigerant consisting of ammonia and water. Said generator is provided with the main burner 32 which is operated to boil the ammonia from said generator into said ammonia condensing coil 5 through the conduit 34, vessel 35, conduit 36, vessel 37 and conduit 38. Said vessels 35 and 37 form a rectifier for elimination of any water which might be entrained in the ammonia vapor, such water being permitted to gravitate back into the generator 31 through the conduit 40.

In order to cool the generator and its residual water contents between the successive periods of ammonia evaporation in the cycles of operation of said system, I find it convenient to extend in said generator the coil 42 containing ethyl chloride or other fluid having a low boiling point. Said generator cooling coil 42 is connected by the conduit 43 with the ethyl chloride condensing coil 44 which is similar in construction to said coil 5 but which is connected by the conduits 45, 46, 47, and 48 with the opposite end of said generator cooling coil 42 in a normally closed circuit entirely separate and distinct from the normally closed circuit of the main refrigerant. The vessel 49 is interposed between the conduits 45 and 46 as an ethyl chloride receiver to which the charge of said chloride is initially introduced and from which it may be removed.

I find it convenient to control the flow of ethyl chloride in said system by means of two valves, to wit, the pressure limiting valve 51 interposed between said conduits 47 and 48 and which is adjustable to determine the normal working pressure in the auxiliary refrigerant circuit, and the shut-off valve 52 interposed between said conduits 46 and 47, which latter stops the flow of the auxiliary refrigerant in its circuit whenever the generator is being heated to generate ammonia in the main refrigerant circuit. I find it convenient to provide said shut-off valve 52 with thermostatic controlling means including the coil 54 containing any fluid readily responsive to changes in temperature and in cooperative relation with the auxiliary burner 55, the supply to which is increased and diminished simultaneously with the supply to the main burner. Said coil 54 is provided with the separate burner 55, apart from the main burner 32, to permit it to cool off more rapidly, to open said shut-off valve 52, than it would cool if said coil 54 were local to the main burner and subjected to the residual heat in the main combustion chamber after the supply of gas to the main burner 32 is diminished, as herein described.

Both said main refrigerant circuit and said auxiliary refrigerant circuit are controlled, in coordinate relation, by thermostatically operative means; whereby abnormal pressure in either of said circuits is effective to diminish the supply of fuel gas to said burner and abnormal temperature in either of said circuits is effective to start said fan, to cool said condensers, as hereinafter described.

I find it convenient to supply both of said burners 32 and 55 from the conduit 56 under control of the thermostatically operative valve 57, which is stressed by the spring 58 to close it. Said valve is adapted to be opened to increase the supply of gas to both burners 32 and 55 at the proper time in the cycle of operation, (determined by the temperature of the contents of said ammonia container 3 of the evaporator, to which said bulb 25 is subjected,) by the connection of said bulb, thru the conduit 26, with the corrugated metal bellows 59. Said valve 57 is operated reversely, to reduce the supply of gas to said burners 32 and 55, at the proper time, so as to leave only a pilot flame at each, by providing the thermostatic bulb 60 in said generator 31 and connecting it, thru the conduit 61, with the corrugated metal bellows 62.

In the position of the automatic control mechanism shown in Fig. V; the valve 57 is closed, by its spring 58, to stop the flow of gas to said burners 32 and 55; the toggle valve lever 63, which is fulcrumed at 64, being tilted to the right, where it is temporarily held by the toggle spring 65. Said spring is pivotally connected at its lower end to said lever 63 and at its upper end to the stationary bracket 66. Said lever 63 was automatically thrust into that position, by the slide 67 which is mounted to reciprocate thru the stationary bearing 68 in the casing 69; said slide being pivoted at its outer end to the lever 70 which is fulcrumed at 71 and provided with the weight 73 which holds it continually in cooperative relation with said bellows 62 which, in Fig. V, is shown in collapsed position. In such position, said slide 67 is temporarily detained by the pawl 74 which is pivoted at 75 on the lever 76 and has the spring 77 stressing it into engagement with the projection 78 on said slide. Said lever 76 is fulcrumed at 80 in said casing 69 and provided with the weight 81, which is adjustable to variably predetermine the resistance to displacement which must be overcome by the expansion of the fluid in the bellows 62, thus subjected to the temperature in the generator. Consequently, such variable resistance determines the temperature which is attainable in the generator before said lever 70 is displaced to the right in Fig. V far enough to uplight said lever 76 to disengage said slide 67 from said pawl 74 and release said gas valve 57, by the thrust of said slide 67 against said lever 63, and thus permit said valve 57 to be closed, by its spring 58, to the position shown in Fig. V.

As shown in Fig. V, said lever 63 carries an electric switch 83, which is conveniently of the evacuated mercury tube type including terminals 84 and 85 adapted to be bridged by a body of mercury 86 when said switch is tilted in the opposite direction. Said switch is included in the circuit of the fan 87 indicated in Fig. IV which circuit is opened to stop the fan when said switch 83 is tilted to the position shown in Fig. V.

Said lever 63, shown in Fig. V, is adapted to be tilted in the reverse direction to close said switch 83 and start the fan 87 in operation to cool said condensers, by means of the slide 88 which is pivotally connected at 89 with the lower end of the lever 90 and extends through the slot 91 in said toggle lever 63. Said lever 90 is fulcrumed at 92 in said casing 69 and carries the weight 93 continually maintaining it in cooperative relation with said bellows 59. However, in the position shown, said bellows 59 is expanded to the limit of which it is capable by reason of the subjection of the fluid therein to the temperature in the evaporator ammonia container 3 and has thrust said lever 90 against the stationary stop 95 in said casing 69 as shown in Fig. V. In that position of said lever 90 the slide 88 has been thrust up the stationary incline 96 on said bearing 68 in said casing 69 so as to lift said slide from engagement with the bottom of said slot 91 in said toggle lever 63. However, when said bellows 59 collapes to the limit for which it is adapted, by reason of the lowering of temperature in said evaporator ammonia container 3; said weight 93 causes said slide 88 to be withdrawn to the right in Fig. V, down the incline 96, until the shoulder 97 thereon slips through the slot 91 and drops into engagement with the lever 63 at the lower end of said slot in readiness to thrust said lever 63 to the left in Fig. V when said bellows 59 is expanded by increment in temperature of the ammonia in the evaporator container 3, which movement of the bellows 59 then reverses the position of the valve 57 and switch 83, to open said valve to increase the supply of fuel gas to the burners 32 and 55 to the utmost and to close the circuit of the fan 87 through the terminals 84 and 85.

Said valve 57 controlling the supply of fuel gas to said burners is thus alternately opened and closed in accordance with the temperatures in said evaporator ammonia container 3 and in said ammonia generator 31 and, contemporaneously, the operation of said fan is controlled to insure the cooling of the condensers at the proper time in each cycle of operation of the system.

Moreover, I prefer to provide said gas supply conduit 56 with the safety valve 99 having controlling means affected by the condition of the auxiliary refrigerant circuit so as to avoid any dangerous excess pressure in that system.

Said valve 99 is similar to the valve 57 in that it is provided with the spring 100 continually tending to close it. Said valve 99 is provided with the lever 101 which, intermediate of its length, engages the stem of said valve 99 and is loosely held by guide pins 102 in the frame plate 104, and extending thru respective slots in said lever upon opposite sides of said stem. In the position shown in Fig. V, said lever 101 is operative upon the fulcrum plunger 103; being pushed down by the lever 105, to hold said valve 99 open. Said lever 105 is fulcrumed at 106 in the frame plate 107 and continually subjected to the stress of the spring 108, the upper end of which is pivotally connected with said lever at 109. The lower end of said spring 108 rests upon the vertically adjustable abutment 110 which has the screw threaded shank 111 in threaded engagement with the base plate 112 which is common to said casing 69 and to said frame plate 107. Said spring 108 tends to continually hold the left hand end of said lever 105 in cooperative relation with the corrugated metal bellows 114 which is in communication through the conduit 115 with any portion of the auxiliary refrigerant circulating system so as to be continually expanded in opposition to said spring 108, to an extent which is due to the pressure of the auxiliary refrigerant. Consequently, if the pressure of said auxiliary refrigerant exceeds that for which said control spring 108 is adjusted; said spring is compressed to permit said lever 105 to be tilted downward at its left hand end in Fig. V and thus release its right hand end from the lever 101 and thus permit the valve 99 to be shut by its spring 100 when the pressure of the auxiliary refrigerant exceeds a predetermined degree. Such closure would be gradual and the effective area of the gas passage with respect to said valve 99 continually varying in accordance with the respectively opposite stresses of said spring 108 and bellows 114 on said lever 105, if means were not provided to compel a snap action of said lever 105. Therefore, I provide the left hand end of said lever 105 with the transversely projecting pin 117 and continually present in the path of movement thereof the cam abutment 118 which is carried by the bell crank lever 119 which is fulcrumed at 120 in the bearing 121 on said base plate 112. Said lever 119 has the arm 123 provided with the axially adjustable stud screw 124 adapted to bear upon said base plate 112 to limit the movement of said cam 118 toward the fulcrum 106 of said lever 105, and said lever 119 is continually stressed toward said fulcrum by the spring 126 which is secured at its right hand end to the stud screw 127 extending in said frame plate 107, and is pivotally connected at its left hand end to the stud 128 on said cam lever 119. The effect of that arrangement is that the fluid pressure in the bellows 114 may increase with said pin 117 in contact with said cam 118 held by said spring 126, without releasing movement of said lever 105 until the pressure thus accumulated is sufficient to overcome the combined stresses of said springs 108 and 126; whereupon, said cam 118 yields by movement to the left in Fig. V to permit instantaneous downward movement of said lever 105 at that end and thus permit instantaneous closing movement of said valve 99.

However, in order to permit said valve 99 to be closed by its spring 100, if and when the pressure of the main refrigerant exceeds that for which the apparatus is calibrated, I provide safety releasing mechanism for withdrawing the fulcrum plunger 103 from operative relation with said lever 101 as a consequence of such excess pressure of the main refrigerant, whereby said lever 101 is released to operate upon the right hand end of said lever 105, as a fulcrum, without movement of the lever 105. In that abnormal operation, the lever 101 is permitted to rise at its right hand end and is lifted by the spring 100 which then closes said valve 99.

Mechanism to effect such emergency release is shown in Fig. VI, wherein said fulcrum plunger 103 is rigidly connected with the carriage 130, and longitudinally adjustable by the screws 132 and 133 upon the slide 134 which is supported at its front end by said plunger 103 which slides in said frame plate 104. Said slide 134 is supported at its rear end in the frame plate 135 which is fixed on said base plate 112, and said plunger is normally held in operative engagement with said lever 101 by the spring 136. However, said slide 134 is adapted to be shifted rearwardly to withdraw said plunger 103 from engagement with said lever 101 by the bell crank lever 138 which is fulcrumed at 139 in the bearing bracket 140 which is fixed on said base plate 112. Said bell crank lever 138 is connected, by the link 141, with the end of the bent flattened tube 142 which is connected with the main refrigerant circulating system by the conduit 143. The arrangement is such that said fulcrum plunger 103 is normally idly reciprocated in engagement with said lever 101, but when the pressure of the main refrigerant exceeds that for which said tube 142 is calibrated; said tube straightens abnormally and withdraws said fulcrum plunger 103 from engagement with said valve lever 101, and permits the gas valve 99 to shut. When said pressure is diminished to the normal; the right hand end of said lever 101 must be manually depressed to permit its reengagement by said fulcrum plunger 103, as shown in Figs. V and VI.

As shown in Fig. V; said lever 105 carries the electric switch 145 which is conveniently of the evacuated mercury tube type, including terminals 146 and 147 adapted to be bridged by the body of mercury 148 when said switch is tilted in the opposite direction. Said switch is included in the circuit of said fan 87, indicated in Fig. IV, which circuit is opened to stop the fan when said switch 145 is tilted to the position shown in Fig. V. However, said switch is closed by tilting movement, in the opposite direction, effected by the expansion of said bellows 114 under the pressure of the auxiliary refrigerant supplied thereto through the conduit 115.

Therefore, said switch 145 and the control mechanism therefor, above described, insure that said fan 87 shall be operated to cool the condenser 44 at the proper time in each cycle of operation of said refrigerating system, regardless of the position of said switch 83; said two switches being in multiple relation in the circuit of said fan 87.

In order to light said burners 32 and 55, I prefer to provide them with respective pilot burners 150 and 151 which are both supplied with gas thru the conduit 152 to support respective pilot flames 153 and 154. Said conduit 152 is connected with the gas supply conduit 56 on the pressure side of said valve 57 so that said pilot flames 153 and 154 may be continuously maintained independently of said valves 57 and 99, but all of the fuel gas supply to the apparatus may be shut off by the stop valve 155 in said conduit 56. The supply of gas to said pilot burners 150 and 151 is automatically controlled by the thermostatically operative valve 157 which is opened when its thermostatic element 158 is subjected to the heating effect of a match flame or equivalent thereof but is automatically closed at any less temperature; so that, if the flame 153 at said pilot burner 150 of the main burner 32 is accidentally extinguished, said valve 157 is automatically closed to shut off the supply of gas to both pilot burners 150 and 151.

The apparatus above described may be operated as follows:

To initiate the operation of the apparatus, the gas stop valve 155 is opened, and the thermostatic member 158 of the pilot valve 157 warmed with a match flame until said valve opens to supply gas thru both pilots 150 and 151 which is then ignited to form the flames 153 and 154.

Thereupon, the valve lever 63 may be manually thrust to the left in Fig. V, to open said valve 57, thus affording the maximum supply of gas to both said burners 32 and 55 which is, of course, ignited by the respective pilot flames 153 and 154.

Of course, such movement of said valve lever 63 to the left tilts the switch 83 to close the circuit energizing the fan 87 which, being thus started, continues to operate until said lever 63 is thrust in the opposite direction, as hereinafter described.

Thereupon, the heat from the burner 32 causes the ammonia ingredient of the main refrigerant in solution in said generator to boil off through said conduits 34 and 38 of the main refrigerant circuit into the condensing coil 5, where it is cooled by the operation of said fan 87, with the effect of condensing the ammonia vapor, forming liquid anhydrous ammonia which gravitates to the bottom of the evaporator 3. Said burner 32 raises the temperature of the main refrigerant in the generator 31 to a temperature of, say, 260° F. However, that is below the boiling point of the water constituent of the ammonia solution, at the pressure generated by the evaporation of the ammonia from the solution, and, consequently, only the vaporized ammonia is discharged from the generator into the conduits 34, 38, etc., comprising the main refrigerant circulating system. However, at that temperature, the fluid in the bulb 60, conduit 61, and corrugated bellows 62 is expanded to exert a pressure of about fifteen pounds per square inch upon the lever 70, with the effect of thrusting said lever to the right in Fig. V until the pawl 74 is lifted and disengaged from the projection 78 on the slide 67, thus releasing the latter with a snap action, causing it to thrust said valve lever 63 to the right, to the position shown in Fig. V, thus closing said valve 57 and shutting off the supply of gas to said burners 32 and 55; but, leaving the pilot flames 153 and 154 at the burners 150 and 151.

Such movement of said lever 63, of course, reverses the position of the switch 83 and breaks the circuit which has been energizing the fan 87 and cooling the ammonia condensers 5.

Closure of the gas valve 57 as above described, extinguishes the flame of the burner 55 leaving only the pilot flame 154 thereat. Thereupon, the coil 54 cools and opens the auxiliary refrigerant shut-off valve 52 and permits the auxiliary refrigerant to circulate through the coil 42 in the generator to cool the contents of the latter.

The heat absorbed by the auxiliary refrigerant from the contents of said generator 31 increases the pressure in the auxiliary refrigerant circuit, which increase distends the bellows 114, with the effect of depressing the spring 108 and tilting the switch 145 from the open position shown in Fig. V to closed position, thus reenergizing said fan 87 to cool the auxiliary refrigerant condenser coil 44. The heat thus absorbed from the contents of the generator 31 by the auxiliary refrigerant, is, of course, dissipated in the condenser coil 44, by such operation of the fan 87, and such operation continues until the generator contents are cooled to a predetermined degree for which the apparatus is calibrated; substantially the temperature of the atmosphere surrounding said generator 31. Such lowering of the temperature of the generator contents is, of course, accompanied by a corresponding lowering of the temperature in the auxiliary refrigerant circuit including coil 42, etc., with consequent collapse of said bellows 114 and restoration of the switch 145 to the open position shown in Fig. V.

The reduction in the temperature of the contents of the generator 31 of course reduces the pressure in the main refrigerant circuit including the ammonia evaporator 3; with the effect that the ammonia which has been liquefied in said container evaporates and is reabsorbed in the residual water in the generator 31, thus rapidly reducing the temperature of the evaporator and the body of brine 7, which consequently absorbs the heat from the refrigerator food compartment 2.

As a consequence of the lowering of temperature in the ammonia container 3 incident to the evaporation of ammonia therein, as above described, the bulb 25 is cooled, the fluid extending in said bulb and the conduit 26 and the bellows 59 contracts, and said bellows 59 collapses, permitting the weight 93 shown in Fig. V to shift the lever 90 and slide 88 to the right in Fig. V until the shoulder 97 on said slide 88 drops into engagement with the right hand side of the lever 63, in readiness to thrust said lever 63 to the left when the fluid in said bellows 59 is reexpanded. Such reverse movement of the bellows 59 is consequent upon the lowering of temperature in the ammonia evaporator 3 when the liquid ammonia has evaporated and is formed by absorption of heat from said food compartment 2. The fluid contents of the bulb 25, conduit 26, and bellows 59 being thus warmed; said bellows 59 expands and moves the lever 90 to the left, toward the position shown in Fig. V, carrying with it the lever 63 which, being thus moved to the left in Fig. V, effects the opening of the gas valve 57 and the closing of the electric circuit in the switch 83 to resume the operation of the burners 32 and 55, and of the fan 87, as at the beginning of the cycle above described. The apparatus operates in such cycles automatically and continuously until it is desired to stop the operation of the system as a whole, which may be done by closing said stop valve 155.

Therefore, it may be observed, that at the termination of the generating cycle the fuel gas is turned off and the valve controlling the secondary refrigerant opened automatically. Said secondary refrigerant then circulates through the coil 42 in the generator 31, and thence to the condenser coil 44 in the flue through which air is circulated by the fan 87, thus initiating the cooling cycle. The air current then condenses in the coil 44, the secondary refrigerant which is recirculated to continue the cooling of the generator and continue the cooling cycle. At the end of each cooling cycle the conditions are as follows:

The generator 31 is at substantially room temperature; said coil 42 in the generator is substantially full of the secondary refrigerant, and the thermostat is ready to turn on the fuel gas.

Thereupon, the thermostat 57 operates to turn on the fuel gas and the secondary refrigerant valve 52 is automatically closed as a consequence of the heating of the small coil 54 by the gas flame from the burner 55 and said fan 87 automatically started at the same time.

As soon as the contents of the generator 31 commence to warm, the secondary refrigerant in the coil 42 begins to evaporate, and unless the evaporated refrigerant is speedily condensed, sufficient pressure is produced to operate the safety shut-off valve 52 to turn off the fuel gas; the function of that valve being to shut off the fuel gas if for any reason the pressure in the secondary refrigerating system exceeds a predetermined point.

Inasmuch as the ammonia condenser 5 commences its function as soon as the fuel gas is turned on; it is obvious that it is necessary for both the ammonia condenser coil 5 and the secondary refrigerant condenser coil 44 to be cooled at the same time, and that they have an interdependence until such time, in fact, as the secondary refrigerant in the coil 42 of the generator 31 has been boiled out by the heat from the burner 32, condensed in said coil 42 and returned to the secondary refrigerant receiver 49 in which it is temporarily detained by the valve 52 which prevents it from returning into the coil 42 in the generator 31.

Moreover, during the cooling cycle, the main refrigerant, ammonia, returns to said generator 31 by way of the ammonia condenser 5, in the form of a vapor, at a substantially lower temperature than the atmosphere. Said condenser 5 is thereby reduced in temperature to below that of the atmosphere. As said fan 87 brings the atmospheric air first into contact with said ammonia condenser 5 before it is brought into contact with the secondary refrigerant condenser 44; such reduced temperature of the condenser 5 assists the cooling of the condenser 44 and hastens the ultimate cooling of the generator 31.

It is for the reasons and to attain the advantages above stated that the ammonia condenser 5 is placed preceding the secondary refrigerant condenser 44 in the current of air induced by said fan 87. If the position of said condensers were reversed with respect to the direction of flow of the air; the warm air passing from the secondary refrigerant coil during the time that the refrigerant is evaporating from the coil 42 in the generator, i. e., during the initial stages of each heating cycle, would heat the ammonia condensing coil 5, which is directly contrary to the result desired and which is attained by the relation shown, and, in such reversed relation of the two condensers, the warm air from the secondary refrigerant would warm the returning ammonia vapor and thus increase the time necessary to cool the generator 31 to the required degree, during the cooling cycle.

Therefore, the arrangement of the primary and secondary refrigerant condensers in the series relation shown in the single flue produces the new result of an advantageous cooperative relation incident to the contemporaneous operation of said condensers, as above described.

Of course, said auxiliary refrigerant shut-off valve 52 may be automatically operated by any heating means other than the auxiliary gas burner 55. For instance, an electric heating coil 159 may be inserted in said coil 54 and energized at the proper time by inclusion in the electric circuit from which the fan 87 is energized.

Moreover, altho the construction and arrangement of the means for air cooling the condenser are adapted for inclusion in the refrigerating system above described, they may, of course, be advantageously employed in other systems which are not of that specific character.

Therefore, I do not desire to limit myself to the precise details of construction or arrangement of the apparatus herein described, as it is obvious that various modifications may be made therein without departing from the essential features of my invention, as defined in the appended claims.

I claim:

1. In a refrigerating system, the combination with a main refrigerant circuit including a generator and a condenser; of an auxiliary refrigerant circuit including a coil in cooperative relation with said generator, and a condenser; an air flue inclosing said two condensers; and a fan at one end of said flue; whereby both of said condensers are cooled by the operation of said fan; including thermostatically operative means adapted to control the operation of said fan in accordance with the temperature in said main refrigerant circuit.

2. In a refrigerating system, the combination with a main refrigerant circuit including a generator and a condenser; of an auxiliary refrigerant circuit including a coil in cooperative relation with said generator, and a condenser; an air flue inclosing said two condensers; and a fan at one end of said flue; whereby both of said condensers are cooled by the operation of said fan; including thermostatically operative means adapted to control the operation of said fan in accordance with the temperature in said auxiliary refrigerant circuit.

3. In a refrigerating system, the combination with a main refrigerant circuit including a generator and a condenser; of an auxiliary refrigerant circuit including a coil in cooperative relation with said generator, and a condenser; an air flue inclosing said two condensers; and a fan at one end of said flue; whereby both of said condensers are cooled by the operation of said fan; wherein each of said condensers includes a plurality of refrigerant conduits extending in parallel spaced relation transversely with respect to the direction of movement of the air in said flue, and a series of metal plates, in parallel spaced relation, thru which said conduits extend; said plates being arranged in parallel planes extending transversely to the axes of said conduits and parallel with the direction of movement of the air in said flue.

4. In a refrigerating system, the combination with a main refrigerant circuit including a generator, a condenser, and an evaporator; of an auxiliary refrigerant circuit including a coil in cooperative relation with said generator, a condenser, a pressure limiting valve and a shut-off valve; and thermostatically operative means adapted to control the operation of said valves in accordance with the temperature in said system.

5. In a refrigerating system, the combination with a main refrigerant circuit including a generator, a condenser, and an evaporator; of a gas burner in cooperative relation with said generator; valve means controlling the supply of gas to said burner; an auxiliary refrigerant circuit including a coil in cooperative relation with said generator, a condenser, a pressure limiting valve, and a shut-off valve; and thermostatically operative means adapted to control the operation of said valves in accordance with the temperature in said system, including bulbs in said generator and evaporator, containing temperature responsive fluid.

6. In a refrigerating system, the combination with a main refrigerant circuit including a generator, a condenser, and an evaporator; of a gas burner in cooperative relation with said generator; valve means controlling the supply of gas to said burner; an auxiliary refrigerant circuit including a coil in cooperative relation with said generator, and a condenser; and thermostatically operative means adapted to control said gas valve in accordance with the temperature in said auxiliary circuit; whereby abnormal pressure in said auxiliary circuit is operative to reduce the supply of gas to said burner.

7. In a refrigerating system, the combination with a main refrigerant circuit including a generator, a condenser, and an evaporator; of a gas burner in cooperative relation with said generator; valve means controlling the supply of gas to said burner; an auxiliary refrigerant circuit including a coil in cooperative relation with said generator, and a condenser; and thermostatically operative means adapted to control said gas valve in accordance with the temperature in said auxiliary circuit and in accordance with the temperature in said main circuit; whereby abnormal pressure in either of said circuits is operative to reduce the supply of gas to said burner.

8. In a refrigerating system, the combination with a main refrigerant circuit including a generator, a condenser, and an evaporator; of a gas burner in cooperative relation with said generator; valve means controlling the supply of gas to said burner; an auxiliary refrigerant circuit including a portion in operative relation with said generator, and a condenser; an electric fan adapted to cool said condensers; an electric switch adapted to control said fan; and thermostatically operative means adapted to control said gas valve and said fan in accordance with the temperature in said main circuit; whereby abnormal pressure in said main circuit is operative to reduce the supply of gas to said burner, and start said fan.

9. In a refrigerating system, the combination with a main refrigerant circuit including a generator, a condenser, and an evaporator; of a gas burner in cooperative relation with said generator; valve means controlling the supply of gas to said burner; an auxiliary refrigerant circuit including a portion in cooperative relation with said generator, and a condenser; an electric fan adapted to cool said condensers; an electric switch adapted to control said fan; and thermostatically operative means adapted to control said gas valve and said fan in accordance with the temperature in said auxiliary circuit; whereby abnormal pressure in said auxiliary circuit is operative to reduce the supply of gas to said burner, and start said fan.

10. In a refrigerating system, the combination with a main refrigerant circuit containing an aqueous solution of ammonia, and including a generator, a condenser, and an evaporator; of an auxiliary refrigerant circuit, including a portion in cooperative relation with said generator, and a condenser, and containing a refrigerant having a boiling point lower than the temperature of the contents of said generator at any time during the operation of the system; an electric fan adapted to cool said condensers; switch means adapted to control said fan; and thermostatically operative means adapted to control said switch to start and stop said fan in accordance with the temperature of both of said refrigerants in said system.

11. In a refrigerating system, the combination with a main refrigerant circuit including a generator, a condenser, and an evaporator; of an auxiliary refrigerant circuit including a portion in cooperative relation with said generator, and a condenser; an air flue inclosing said two condensers; an electric fan arranged to induce movement of air through said flue; an electric switch adapted to control said fan; and thermostatically operative means adapted to operate said switch to move the air through said flue intermittently when the temperature of either the main refrigerant circuit or the auxiliary refrigerant circuit is such as to require cooling; whereby both of said condensers are adapted to be cooled by movement of air through said flue.

12. In a refrigerating system, the combination with a main refrigerant circuit including a generator, a condenser, and an evaporator; of a gas burner in cooperative relation with said generator; an auxiliary refrigerant circuit including a portion in cooperative relation with said generator and a condenser; and valve means controlling the supply of gas to said burner, including a lever in operative relation with said valve intermediate of its length and adapted to be alternately operated in relation to two fulcrums respectively at opposite ends thereof; and thermostatically operative means adapted to thus alternately operate said lever respectively in accordance with the temperature in said auxiliary circuit; whereby abnormal pressure in either of said circuits is operative to reduce the supply of gas to said burner.

13. In a refrigerating system, the combination with a main refrigerating circuit including a generator, a condenser, and an evaporator; of a gas burner in cooperative relation with said generator; valve means controlling the supply of gas to said burner, including a lever in operative relation therewith; a slide member adapted to alternately engage and release said lever, to limit the movement thereof; and thermostatically operative means adapted to operate said slide member in accordance with the temperature in said system.

14. In a refrigerating system, the combination with a main refrigerant circuit including a generator, a condenser, and an evaporator; of a gas burner in cooperative relation with said generator; an auxiliary refrigerant circuit including a portion in cooperative relation with said generator and a condenser; valve means controlling the supply of gas to said burner, including a lever in operative relation therewith; a slide member adapted to alternately engage and release said lever, to limit the movement thereof; and thermostatically operative means adapted to operate said slide member in accordance with the temperature in said main refrigerant circuit.

15. In a refrigerating system, the combination with a main refrigerant circuit including a generator and a condenser; of an auxiliary refrigerant circuit including a coil in cooperative relation with said generator, and a condenser; an air flue inclosing said two condensers; and a single fan at one end of said flue whereby both of said condensers are cooled by the operation of said fan and the air moved by said fan first encounters said main condenser and thereafter encounters said auxiliary condenser.

In testimony whereof, I have hereunto signed my name at Philadelphia, Pennsylvania, this fifteenth day of July, 1930.

ARCHIE HUGH STRONG.

CERTIFICATE OF CORRECTION.

Patent No. 1,884,353.　　　　　　　　　　　　　　　October 25, 1932.

ARCHIE HUGH STRONG.

It is hereby certified that error appears in the printed specification of the above numbered patent requiring correction as follows: Page 5, lines 52 and 53, for "condensers" read "condenser"; and line 115, for "formed" read "warmed"; and that the said Letters Patent should be read with these corrections therein that the same may conform to the record of the case in the Patent Office.

Signed and sealed this 20th day of December, A. D. 1932.

(Seal)　　　　　　　　　　　　　　　　　　　　　M. J. Moore,
　　　　　　　　　　　　　　　　　　　　　Acting Commissioner of Patents.